C. HAMMER.

ANIMAL CLEANING APPARATUS.

APPLICATION FILED JULY 2, 1909.

Reissued Jan. 25, 1910.

13,078.

2 SHEETS—SHEET 1.

Witnesses.
L. M. Saupter.
George A. Neubauer,

Conrad Hammer Inventor.
By A. J. Saupter Attorney.

C. HAMMER.

ANIMAL CLEANING APPARATUS.

APPLICATION FILED JULY 2, 1909.

Reissued Jan. 25, 1910.

13,078.

2 SHEETS—SHEET 2.

Witnesses.

L. M. Dangster.

George A. Neubauer.

Conrad Hammer. Inventor.

By A. J. Sawyer. Attorney.

UNITED STATES PATENT OFFICE.

CONRAD HAMMER, OF BUFFALO, NEW YORK.

ANIMAL-CLEANING APPARATUS.

13,078. Specification of Reissued Letters Patent. Reissued Jan. 25, 1910.

Original No. 908,991, dated January 5, 1909, Serial No. 414,516. Application for reissue filed July 2, 1909. Serial No. 505,680½.

*To all whom it may concern:*

Be it known that I, CONRAD HAMMER, a citizen of the United States, residing at Buffalo, in the county of Erie and State of New York, have invented a certain new and useful Improved Animal-Cleaning Apparatus, of which the following is a specification.

This invention relates to an improved animal cleaning apparatus and comprises a scraping device and a suction mechanism connected to the scraping device.

The object of the invention is to provide an automatic suction mechanism to be utilized in conjunction with a scraping tool to remove the dirt, dust and hair as it is loosened upon the animal's hide by the scraping tool, and to so construct the scraping tool that the suction action is divided and operates through a series of openings to prevent the raising of blisters in the animal's skin.

The invention also relates to certain details of construction, all of which will be fully and clearly hereinafter described and claimed, reference being had to the accompanying drawings in which—

Figure 1:
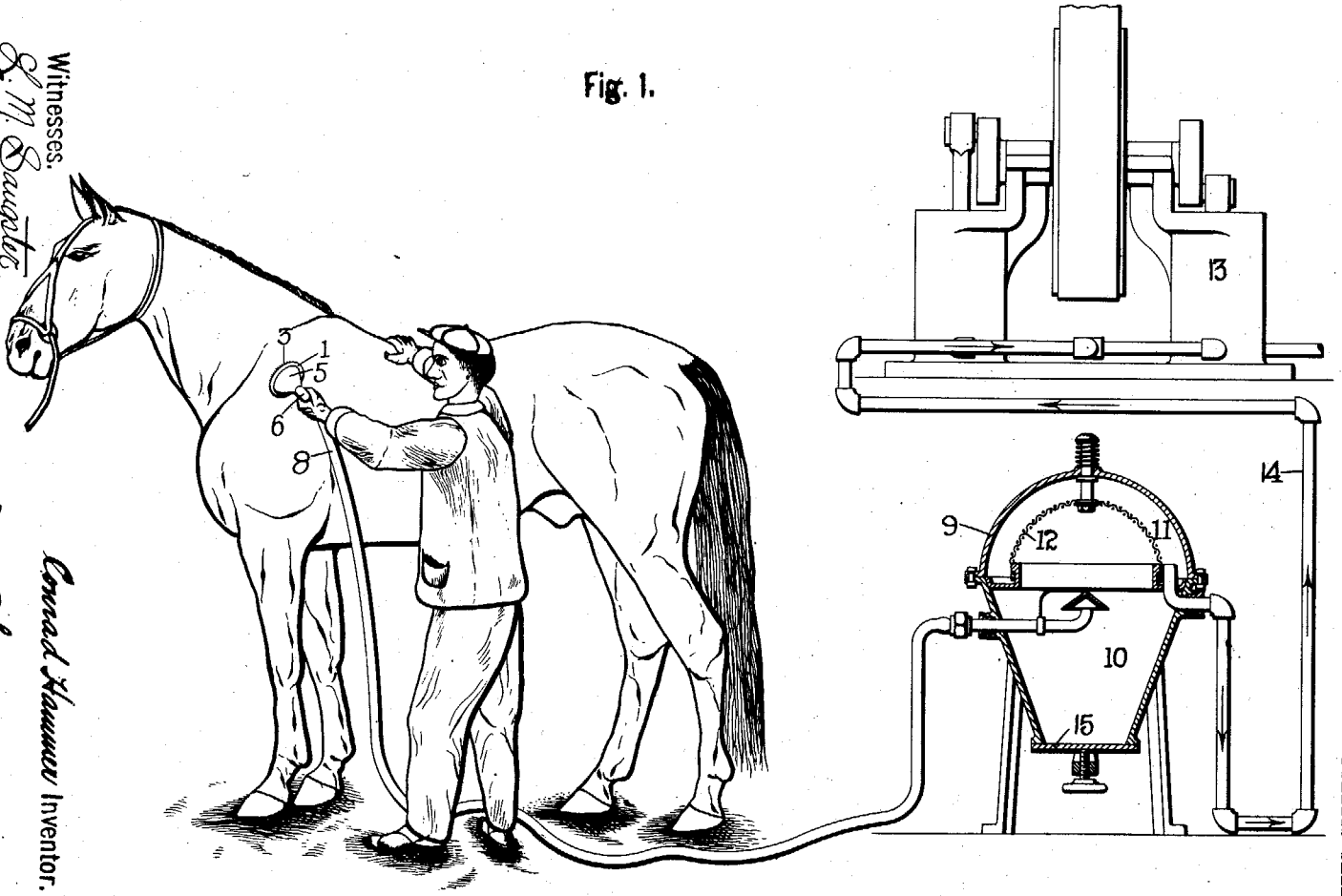
Figure 2:
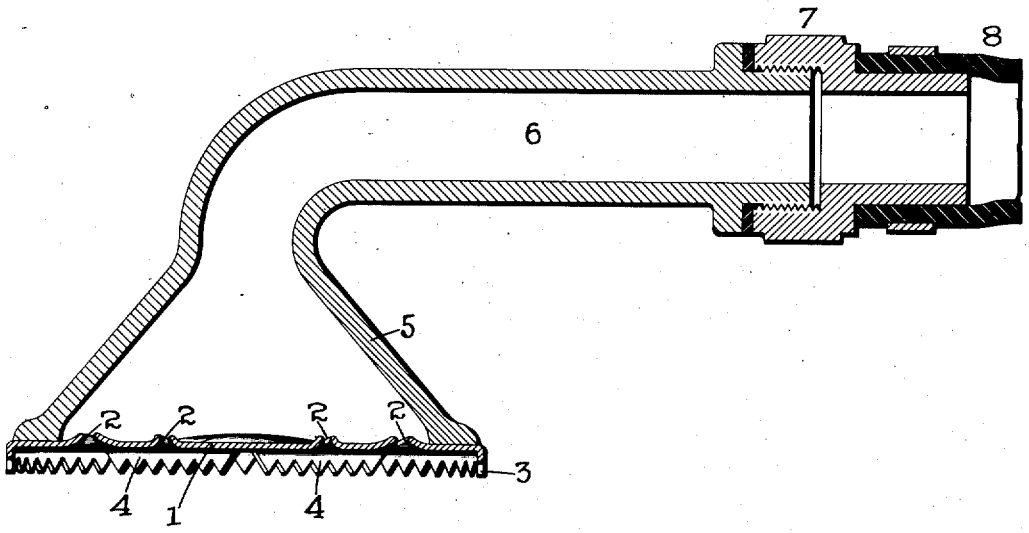
Figure 3:
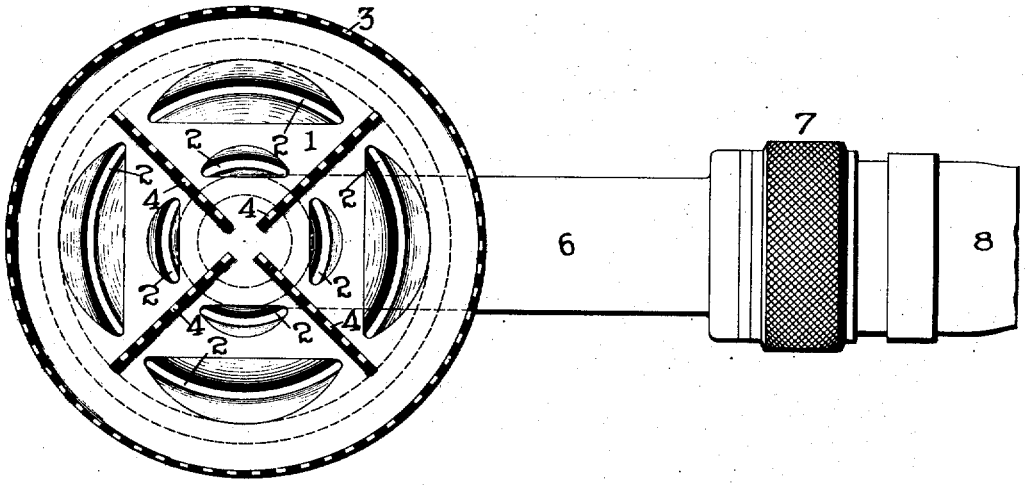

Figure 1 is a general view showing the improved animal cleaning apparatus in operation, a central vertical section being shown through a portion thereof to disclose the interior construction and the pipe connections between the suction pump and vacuum tank being also shown. Fig. 2 is a detached central longitudinal section through the scraping device of the apparatus. Fig. 3 is a bottom plan view of the same.

In referring to the drawings in detail like numerals designate like parts.

This improved apparatus comprises a scraping device and a suction mechanism connected directly by flexible tubing to the scraping device.

The scraping device is preferably of that type known as a curry comb, having a base plate provided with elongated slots and serrated or toothed scraping flanges.

The curry comb may be made in many shapes of which one is illustrated in the accompanying drawings.

In Figs. 2 and 3, a curry comb is shown having a base plate 1, of circular form provided with a series of curved slots 2.

An outer serrated or toothed flange 3 extends at approximately right angles from the outer marginal edge of the circular plate 1 and a series of inner serrated or toothed flanges 4 radiate at equal distances apart from separated points near the center of the plate and extend between the ends of the curved slots 2.

It is to be noted that the metal at the margins of the slots is bent or curved upwardly so that the slots flare inwardly from the scraping side of the curry comb.

A tubular nozzle has its bell-shaped or enlarged outer end 5 fastened to the top surface of the base plate of the scraping device and enlarged sufficiently to inclose all of the slots in the base plate as shown in Fig. 2.

The tubular portion 6 of the nozzle above the bell-shaped end 5 is bent to provide a convenient hand grasping part for the operator in manipulating the curry comb as shown in Fig. 2 and is joined by a screw coupling 7 to one end of a rubber or other flexible tubing 8.

The slotted base plate which is attached to the infundibular end of the nozzle forms a hollow enlargement or bulb at the end of the flexible tubing which constitutes a vacuum chamber.

The object in slotting the base plate is to provide suction openings that are large enough to draw the hair and dirt through into the chamber but yet are sufficiently small to prevent the raising of blisters on the skin of the animal.

In operation the base plate is kept as close as possible to the animal's skin in order to maintain a constant vacuum with but a fair amount of pumping suction and thus reduce the power required to the minimum.

Now referring to Fig. 1 the opposite end of the tubing is connected to what is known as a vacuum tank.

The form of tank illustrated in Fig. 1 consists of an air tight receptacle 9 which is divided into two compartments 10 and 11 by a flexible diaphragm 12 preferably of woven ducking which is sufficiently porous to permit the passage of air and at the same time in a large degree prevent the passage of dust, dirt or hair.

The tubing 8 connects to the lower portion of the tank so as to be in direct communication with the lower compartment 10 of the tank and a suction pump 13 is connected by a pipe 14 to the upper portion of the tank and communicates directly with the upper compartment 11.

The tank 9 is provided with a bottom cover 15 which is removed when it is desired to clean out the tank.

The operation of this improved apparatus will be readily understood by referring to Fig. 1 of the drawings.

The operator, grasping the bent portion of the device, applies the scraping portion to the animal's skin and moves it so as to loosen or dislodge the dirt, dust or hair which is immediately drawn by suction through the slots of the base plate and the nozzle and conducting tube into the lower compartment of the vacuum tank.

The advantages of this improved apparatus are in its perfect cleanliness of operation, all the dust which is raised by an ordinary curry comb being drawn off by suction through the slots in this improved device, its simplicity and cheapness of construction and the rapidity and thoroughness with which it can be operated, the comparatively low power required as the infundibular end of the nozzle is nearly closed by the base plate, the only openings being the small slots in the base plate, and the fact that blisters cannot be raised in the animal's skin owing to separation of the suction into a series of narrow spaces.

I claim—

1. An apparatus of the class described, comprising an animal scraping device having a tubular handle, a slotted base plate closing the outer end of the tubular handle and scraping flanges extending from the slotted base plate, suction mechanism and flexible tubing connecting the suction mechanism to the tubular handle.

2. An apparatus of the class described, comprising an animal scraping device having an enlarged chamber and a slotted base plate closing the outer end of the enlarged chamber and provided with scraping flanges, suction mechanism and flexible tubing connected at one end to the suction mechanism and at the opposite end to the animal scraping device.

3. An apparatus of the class described, comprising an animal scraping device having a tubular handle and a hollow enlargement at the outer end of the handle provided with a slotted plate with scraping projections extending from said plate, a suction pump, a vacuum tank, flexible tubing connecting the vacuum tank, to the tubular handle and tubing connecting the vacuum tank to the suction pump.

4. The combination with suction mechanism, of a currying device consisting of a hollow bulb connected to the suction mechanism and a base plate closing the outer end of the hollow bulb and provided with narrow slots forming suction openings and scraping flanges extending from the base plate and located between the slots.

5. In an apparatus of the class described, an animal scraping device having a tubular body and a base plate closing the outer end of the tubular body; said base plate being provided with perforations which are sufficiently large to permit the passage of hair and dirt into the tubular body and sufficiently small to prevent the raising of blisters by suction on the skin of an animal, and scraping flanges extending therefrom, in combination with suction mechanism and tubular means connecting the suction mechanism to the tubular body.

6. An apparatus of the class described, comprising an animal scraping device having a tubular handle, a slotted base plate closing the outer end of the tubular handle; said base plate having a substantially flat face and scraping flanges extending from the slotted base plate, suction mechanism and flexible tubing connecting the suction mechanism to the tubular handle.

7. An apparatus of the class described, comprising an animal scraping device having a tubular handle, a slotted base plate closing the outer end of the tubular handle; said base plate being arranged substantially parallel with the tubular handle and scraping flanges extending from the slotted base plate, suction mechanism and flexible tubing connecting the suction mechanism to the tubular handle.

8. An apparatus of the class described, comprising an animal scraping device having a tubular handle bent at substantially a right angle, a slotted base plate closing the outer end of the tubular handle and scraping flanges extending from the slotted base plate, suction mechanism and flexible tubing connecting the suction mechanism to the tubular handle.

9. An apparatus of the class described, comprising an animal scraping device having a tubular handle, a base plate closing the outer end of the tubular handle and having non-parallel slots and scraping flanges extending from the base plate, suction mechanism and flexible tubing connecting the suction mechanism to the tubular handle.

10. An apparatus of the class described, comprising an animal scraping device having a tubular handle, a base plate closing the outer end of the tubular handle and having suction perforations not in alinement and scraping flanges extending from the base plate, suction mechanism and flexible tubing connecting the suction mechanism to the tubular handle.

11. An apparatus of the class described, comprising an animal scraping device having a tubular handle, a slotted base plate closing the outer end of the tubular handle and non-parallel toothed scraping flanges extending from the slotted base plate, suction mechanism and flexible tubing connecting the suction mechanism to the tubular handle.

12. The combination with suction mechanism, of a currying device consisting of a hollow bulb connected to the suction mechanism and a substantially flat base plate closing the outer end of the hollow bulb of appreciable width and length and perforated at intervals to provide a series of suction openings and scraping projections extending at right angles from the base plate and arranged at intervals upon the face of the base plate, suction mechanism and flexible tubing connecting the suction mechanism to the tubular handle.

13. The combination with suction mechanism, of a currying device consisting of a hollow bulb connected to the suction mechanism and a base plate closing the outer end of the hollow bulb of appreciable width and length and perforated at intervals to provide a series of suction openings and scraping projections extending from the base plate and arranged at intervals upon the face of the said base plate and extending at angles to each other and in such manner that a plurality of said projections will present themselves in scraping position at any point around the base plate, and flexible tubing connecting the suction mechanism to the tubular handle.

14. An apparatus of the class described, comprising an animal scraping device having a tubular handle, a base plate of circular form closing the outer end of the tubular handle and having a series of slots extending in different directions and scraping flanges extending from the slotted base plate, suction mechanism and flexible tubing connecting the suction mechanism to the tubular handle.

15. An apparatus of the class described, comprising an animal scraping device having a tubular handle, a base plate of circular form closing the outer end of the tubular handle and having a series of non-parallel slots and non-parallel scraping flanges extending from the slotted base plates; suction mechanism and flexible tubing connecting the suction mechanism to the tubular handle.

16. A currying device for vacuum horse-grooming apparatus having a tubular handle and an enlarged chamber, a slotted base plate inclosing the outer end of the enlarged chamber and scraping flanges extending from the slotted base plate.

17. A currying device for vacuum horse-grooming apparatus having a tubular handle and an enlarged chamber, a base plate inclosing the outer end of the enlarged chamber provided with narrow slots forming suction openings and scraping flanges extending from the base plate and located between the slots.

18. A currying device for vacuum horse-grooming apparatus having a tubular handle and an enlarged chamber, a base plate inclosing the outer end of the enlarged chamber, provided with narrow slots forming suction openings, said base plate being arranged substantially parallel with the tubular handle, and scraping flanges extending from the base plate and located between the slots.

19. A currying device for vacuum horse-grooming apparatus having a tubular handle and an enlarged chamber, a base plate inclosing the outer end of the enlarged chamber provided with narrow non-parallel slots forming suction openings and scraping flanges extending from the base plate.

20. A currying device for vacuum horse-grooming apparatus having a tubular handle and an enlarged chamber, a base plate inclosing the outer end of the enlarged chamber provided with narrow slots out of alinement forming suction openings and scraping flanges extending from the base plate.

21. A currying device for vacuum horse-grooming apparatus having a tubular handle and an enlarged chamber, a base plate inclosing the outer end of the enlarged chamber provided with narrow slots forming suction openings and non-parallel toothed scraping flanges extending from the base plate and located between the slots.

22. A currying device for vacuum horse-grooming apparatus having a tubular handle and an enlarged chamber, a base plate inclosing the outer end of the enlarged chamber provided with narrow slots forming suction openings and non-parallel toothed scraping flanges extending from the base plate.

23. A currying device for vacuum horse-grooming apparatus having a tubular handle and an enlarged chamber, a base plate of circular form inclosing the outer end of the enlarged chamber, said base plate having a series of slots extending in different directions and scraping flanges extending from the slotted base plate.

CONRAD HAMMER.

Witnesses:
L. M. SANGSTER,
GEORGE A. NEUBAUER.